(12) United States Patent
Bourgeois et al.

(10) Patent No.: US 10,877,941 B2
(45) Date of Patent: Dec. 29, 2020

(54) METHODS AND SYSTEMS FOR MIGRATING PUBLIC FOLDERS TO ONLINE MAILBOXES

(71) Applicants: Geoffrey Bourgeois, Greely (CA); Greg Campbell, Greely (CA)

(72) Inventors: Geoffrey Bourgeois, Greely (CA); Greg Campbell, Greely (CA)

(73) Assignee: ExchangeSavvy Inc., Lake in the Hills, IL (US)

( * ) Notice: Subject to any disclaimer, the term of this patent is extended or adjusted under 35 U.S.C. 154(b) by 428 days.

(21) Appl. No.: 15/982,102

(22) Filed: May 17, 2018

(65) Prior Publication Data

US 2018/0336222 A1  Nov. 22, 2018

Related U.S. Application Data

(60) Provisional application No. 62/508,128, filed on May 18, 2017.

(51) Int. Cl.
   *G06F 16/185* (2019.01)
   *G06Q 10/10* (2012.01)
   *H04L 12/58* (2006.01)

(52) U.S. Cl.
   CPC ......... *G06F 16/185* (2019.01); *G06Q 10/107* (2013.01); *H04L 51/22* (2013.01)

(58) Field of Classification Search
   CPC .......................... G06Q 10/107; G06F 16/119
   See application file for complete search history.

(56) References Cited

U.S. PATENT DOCUMENTS

| | | | |
|---|---|---|---|
| 2006/0031340 A1* | 2/2006 | Mathew | H04L 51/14 709/206 |
| 2006/0277195 A1* | 12/2006 | Schulz | G06Q 10/107 |
| 2007/0005713 A1* | 1/2007 | LeVasseur | H04L 51/18 709/206 |
| 2008/0109448 A1* | 5/2008 | Aboel-Nil | G06Q 10/107 |
| 2009/0327972 A1* | 12/2009 | McCann | G06Q 10/107 715/853 |
| 2016/0269338 A1* | 9/2016 | Ramaswamy | H04L 51/22 |
| 2017/0214647 A1* | 7/2017 | Shrivastava | G06F 3/0482 |
| 2018/0196822 A1* | 7/2018 | Lewin-Eytan | G06Q 10/107 |

* cited by examiner

*Primary Examiner* — James Trujillo
*Assistant Examiner* — Kurt A Mueller
(74) *Attorney, Agent, or Firm* — Rosenberg, Klein & Lee

(57) ABSTRACT

Accordingly, software providers are quickly migrating enterprise applications to reflect this new framework. However, companies and enterprises today lack a reliable method of handling the migration and amongst the challenges they face is handling the sizing and partition of the legacy public folder hierarchy into the new public folder mailbox structure. Accordingly, it would be beneficial to provide users with a means to handle this mapping from the legacy public folder hierarchy into the new public folder mailbox structure. Further, the cloud software provider migration methodology requires downtime in the source public folders such that mail-enabled public folders are queued freezing these communications until the migration is complete. Further, if the migration process fails then it must be reattempted in full which is not feasible for most business as critical business workflows require the availability of the public folders.

1 Claim, 5 Drawing Sheets

METHODS AND SYSTEMS FOR MIGRATING PUBLIC FOLDERS TO ONLINE MAILBOXES

CROSS-REFERENCE TO RELATED APPLICATIONS

This patent application claims the benefit of U.S. Provisional Patent Application 62/508,128 filed May 18, 2017 entitled "Methods and Systems Relating to Migrating Public Folders to Online Mailboxes", the entire contents of which are incorporated by reference.

FIELD OF THE INVENTION

This invention relates to electronic mail and more particularly to migrating legacy electronic mail infrastructure to current cloud-based electronic mail and collaboration services.

BACKGROUND OF THE INVENTION

Electronic mail (email) is a method of exchanging digital messages between users using electronic devices such as desktop computers, laptops, tablets, and mobile phones. Email first entered substantial use in the 1960s and by the mid-1970s had taken the form now recognized as email. Email operates across computer networks, which today means it is primarily exchanged via the Internet. Whilst some early email systems required the sender and the recipient to both be online at the same time, in common with many instant messaging applications today, today's email systems are based on a store-and-forward model. Email servers accept, forward, deliver, and store messages such that neither the users nor their computers are required to be online simultaneously; they need to connect only briefly, typically to a mail server or a webmail interface, for as long as it takes to send or receive messages.

The term mail server (also known as mail exchanger or MX host) typically refers to a computer performing a mail (message) transfer agent (MTA) function. Within the Internet (worldwide web) the Domain Name System (DNS) associates a mail server to a domain with an MX record containing the domain name of the host(s) providing MTA services. An MTA is software that transfers electronic mail messages from one computer to another using a client-server application architecture. An MTA implements both the client (sending) and server (receiving) portions of the Simple Mail Transfer Protocol (SMTP) and receives mail from either another MTA, a mail submission agent (MSA), or a mail user agent (MUA).

The function of an MTA is usually complemented with some means for email clients (namely software used to access and manage a user's email) to access stored messages. This function typically employs a different protocol wherein the most widely implemented open protocols for the MUA are the Post Office Protocol (POP3) and the Internet Message Access Protocol (IMAP), but many proprietary systems exist for retrieving messages (e.g. Microsoft™ Exchange™, Lotus™ Domino™/Notes™, etc.). However, many systems also offer a web interface for reading and sending email that is independent of any particular MUA.

Against this framework for email Microsoft™ in the late 1990s came to market with Exchange Server™, an on-premises enterprise messaging application. Exchange Server™ included a feature called "Public Folders" which are essentially newsgroups within the application. Over the years, organizations have accumulated vast amounts of data in public folders, and in many cases have integrated public folders in their business workflows. As a result, they are mission critical to many organizations.

However, as nature of electronic communications, electronic devices, work environments etc. has changed dramatically in the past two decades from tight clusters of employees with desktop computers and wired interfaces to highly mobile, geographically distributed teams exploiting portable devices with wireless interfaces that give essentially ubiquitous connectivity globally without temporal constraints then many software applications are migrating from fixed installation concepts to web interfaces and exploiting collaboration solutions in the "cloud" (a metaphor for the Internet or the paradigm where computing resources are offered remotely as a utility on demand).

Accordingly, software providers such as Microsoft™ are quickly migrating enterprise applications to reflect this new framework. For example, Microsoft™ is migrating its Exchange Server™ user base to its cloud-based collaboration solutions, Office365™ or Exchange Online™ However, whilst the cloud-based collaboration solution supports public folders it does so with an underlying structure that is typically fundamentally different than the legacy solution. With the Microsoft™ legacy Exchange Server™ public folders have their own database and mail store whereas within Office365™ they exist as mailboxes with a size limitation.

Companies and enterprises today lack a reliable method of handling the migration. Amongst the biggest challenges is handling the sizing and partition of the legacy public folder hierarchy into the new public folder mailbox structure. Accordingly, it would be beneficial to provide users with a means to handle this mapping from the legacy public folder hierarchy into the new public folder mailbox structure Whilst cloud software providers, e.g. Microsoft™, offer a migration methodology this requires downtime in the source public folders. During this downtime message delivery to mail-enabled public folders will be queued freezing these communications until the migration is complete. However, if the Microsoft migration application programming interface (API) has problems during the migration process, it will fail, and the migration must be reattempted in full. For most businesses, this approach is not feasible because of the downtime as they have critical business workflows that require the availability of the public folders.

Accordingly, it would be beneficial to provide knowledge workers, e.g. users, with processes, methods, and systems that address these limitations allowing the migration to be performed upon "live" systems such that critical business workflows can continue unhindered.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to electronic mail and more particularly to migrating legacy electronic mail infrastructure to current cloud-based electronic mail and collaboration services.

In accordance with an embodiment of the invention there is provided a method of converting an existing public folder hierarchy into new public folder mailboxes comprising:

identifying a plurality of public folders to be converted, the plurality of public folders forming part of the existing public folder hierarchy;

establishing a weighted public folder tree wherein each node in the weighted public folder tree is a public folder of the plurality of public folders and the weight of the node is equal to the total size of all items in the subtree rooted at the node; and mapping the plurality of public folders to public folder mailboxes such that a minimum number of public folder mailboxes are created and each new public folder mailbox does not exceed a maximum mailbox size.

In accordance with an embodiment of the invention there is provided a method comprising:

a) establishing a weighted public folder tree wherein each node in the weighted public folder tree is a public folder of a plurality of public folders to be migrated to public folder mailboxes and the weight of the node is equal to the total size of all items in the subtree rooted at the node;

b) identifying the node with the largest weight node exceeding a predetermined maximum public folder mailbox size (MaxPFMailboxSize);

c) excise the node (N1) from the weighted public folder tree and subtract its weight from all ancestors of the node N1;

d) add a new entry for N1 to a list of public folder mailboxes (PFMailboxes) with a weight equal the weight of N1;

e) repeat steps (b) to (d) until N1 is the root node;

f) find the two PFMailboxes entries that are the smallest and determine whether the sum of their weights is less than MaxPFMailboxSize;

g) upon a positive determination performing the steps:

(h) merge the two PFMailboxes entries into a new public folder mailbox that contains all folders from the two PFMailboxes entries and has a weight equal to the weight of the two PFMailboxes entries;

(i) removing the two PFMailboxes from the list of PFMailboxes; and (j) add the new public folder mailbox to the list of PFMailboxes;

k) repeat step (g) until either there is only a single entry in PFMailboxes or the weight of the two smallest entries when summed exceeds the MaxPFMailboxSize.

In accordance with an embodiment of the invention there is provided a method of migrating public folders from an enterprise server based environment to an online public folder mailbox environment comprising the steps:

identifying a source public folder hierarchy to migrate;

crawl the source public folder hierarchy to acquire metadata about the hierarchy;

determine a public folder mailbox partitioning in dependence upon the metadata and a maximum public folder mailbox size limit;

programmatically create the public folder mailboxes to establish the determined public folder mailbox partitioning;

migrate the source public folders within the source public folder hierarchy to their respective public folder mailbox partitions; and re-run the migration to capture any changes within the source public folders during the initial migration.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
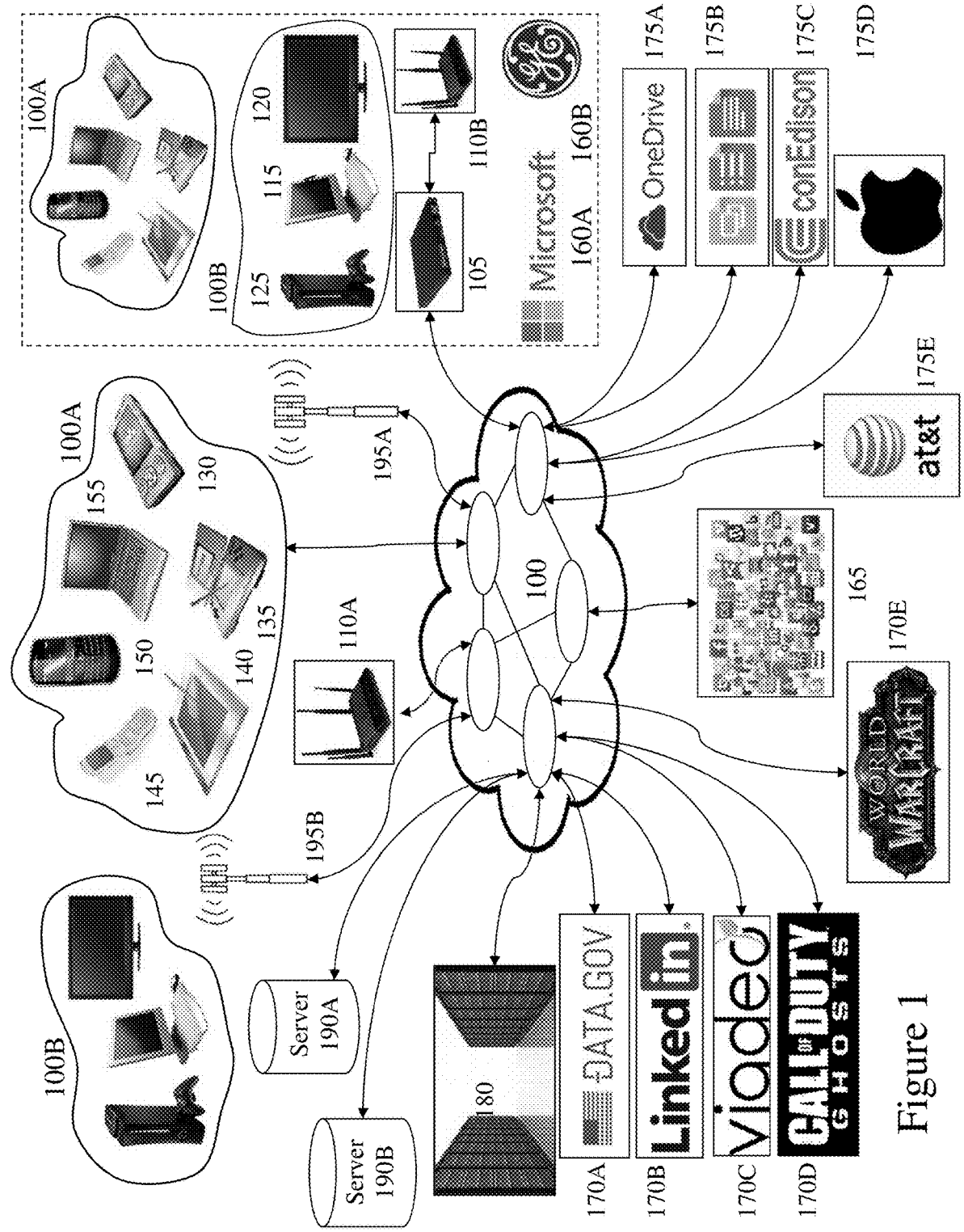
FIG. 1 depicts a network environment within which embodiments of the invention may be employed.

The present invention is directed to electronic mail and more particularly to migrating legacy electronic mail infrastructure to current cloud-based electronic mail and collaboration services.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" (also referred to as a "knowledge worker") as used herein may refer to, but is not limited to, an individual or group of individuals who may, but not limited to, monitor, acquire, store, transmit, process and analyse either locally or remotely to the user data within one or more databases. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may, but not limited to, monitor, acquire, store, transmit, process and analyse either locally or remotely to the user data within one or more databases.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

Reference to a "human interface" or "user interface" as used herein may refer to, but is not limited to, any interface presenting to a type of interface that allows users to interact with electronic devices and/or systems directly and/or remotely. Today the most common user interface (UI) is a graphical user interface (GUI) that allows users to interact with electronic devices and/or systems through graphical icons and visual indicators such as secondary notation, as opposed to text-based interfaces, typed command labels or text navigation.

Reference to a "cloud" as used herein may refer to, but is not limited to, a model of ubiquitous, convenient, on-demand access to a shared pool of configurable computing resources via a network such as the Internet. As such the "cloud" may refer to an application, platform, and/or infrastructure remotely hosted from the user but accessible through a network. As such the cloud may refer to, but not be limited to, cloud computing, cloud servers, cloud (operating system), and cloud storage.

Reference to a "network", more formally a telecommunications network, communications network, computer network or data network, as used herein as used herein may refer to, but is not limited to, a telecommunications network which allows nodes to share resources, transmit data to other local or remote devices, and receive data from other local or remote devices. Devices connected to the network exchange data using data links either between devices or via a combination or network elements (commonly called network nodes or nodes) including, but not limited to, network interfaces, repeaters, hubs bridges, switches, routers, modems, firewalls, local area networks, metropolitan area networks, trunk networks, backbone networks, computer servers, and computer storage. Connections between nodes are established using wired and/or wireless media. Probably the best known computer network is the Internet. Network computer devices that originate, route and terminate the data are examples of network nodes. Nodes can include hosts such as personal computers, smartphones, computer servers as well as networking hardware. Networks in addition to varying in the transmission medium used to carry their signals may also vary in the communications protocols that organize network traffic, the network's size, topology and organizational intent. In many instances, application-specific communications protocols are layered (i.e. carried as payload) over other more general communications protocols.

Reference to "storage", more formally a (data) storage device, as used herein as used herein may refer to, but is not limited to device for recording (storing) information (data). Storage devices may hold information, process information, or both. Storage devices that only hold information is a recording medium. Devices that process information (data storage equipment) may either access a separate portable (removable) recording medium or a permanent component to store and retrieve data. Electronic data storage requires electrical power to store and retrieve that data in either analog data and/or digital data formats on a variety of media including magnetic tape, magnetic disc, optical discs, and semiconductor devices (memory). Most electronically processed data storage media (including some forms of computer data storage) are considered permanent (non-volatile) storage, that is, the data will remain stored when power is removed from the device. In contrast, most electronically stored information within most types of semiconductor (computer chips) microcircuits are volatile memory, for it vanishes if power is removed. Data may be stored uniquely within storage or it may be replicated using one or more protocols such as archiving, backing up, and storage virtualization. Amongst storage virtualization approaches are Redundant Array of Independent Disks (RAID) which combines multiple physical disk drive components into a single logical unit for the purposes of data redundancy, performance improvement, or both using different schemes, or data distribution layouts, which each provide a different balance among the key goals: reliability, availability, performance, and capacity. The concepts of RAID are extended to computer servers within data centers and alike and the distribution of data across multiple storage device can be managed either by dedicated computer hardware or by software. A software solution may be part of the operating system, part of the firmware and drivers supplied with a standard drive controller (so-called "hardware-assisted software RAID"), or it may reside entirely within the hardware RAID controller.

Reference to a "thick UI", "thick client" etc. as used herein may refer to, but is not limited to, an element, e.g. a UI or computer (client), which typically provides rich functionality independent of a central and/or remote server to which the UI and/or client relates.

Reference to a "thin UI", "thin client" etc. as used herein may refer to, but is not limited to, an element, e.g. a UI or computer (client), which typically has high dependency upon a central and/or remote server to which the UI and/or client relates in order to provide rich functionality.

Reference to a "connector" as used herein may refer to, but is not limited to, a technology solution for connecting application servers and information systems etc. Accordingly, a "Connector" may define a software application compliant with a standard for connecting an application server to an information system or a software application forming part of another application in execution upon a server, client, information system etc. that operates by a defined standard a standard set of system-level contracts, for example between an application server and a resource adapter. Such connector standards including, but not limited to, Java Connector Architecture, Java Database Connectivity, and Java EE Connector Architecture.

Referring to FIG. 1 there is depicted a network environment 100 within which embodiments of the invention may be employed supporting online storage systems, applications, and platforms (OS-SAPs) according to embodiments of the invention. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with first and second Enterprises 160A and 160B respectively, such as General Electric™ or Microsoft™ for example, within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, cloud document service provider 170A, e.g. US Government open data portal Data.gov, first and second business networks 170B and 170C respectively, e.g. LinkedIn™ and Viadeo™, first to second online gaming communities 170D and 170E respectively, e.g. Call of Duty™ Ghosts and World of Warcraft™, as well as first and second servers 190A and 190B which together with others, not shown for clarity. Also connected are first and second cloud storage service providers 175A and 175B, e.g. Microsoft One Drive and Google docs, residential service provider 175C, e.g. ConEdison™, an online multimedia distributor 175D, e.g. Apple™, and telecom service provider 175E, e.g. AT&T. Accordingly, a user employing one or more OS-SAPs may through their avatar and/or avatar characteristics interact with one or more such providers, enterprises, and third parties.

First and second servers 190A and 190B may host according to embodiments of the inventions multiple services associated with a provider of rec systems and publishing applications/platforms (OS-SAPs); a provider of a SOCNET or Social Media (SOME) exploiting OS-SAP features; a provider of a SOCNET and/or SOME not exploiting OS-SAP features; a provider of services to PEDS and/or FEDS; a provider of one or more aspects of wired and/or wireless communications; an Enterprise 160 exploiting OS-SAP features; license databases; content databases; image databases; content libraries; customer databases; websites; and software applications for download to or access by FEDs and/or PEDs exploiting and/or hosting OS-SAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides OS-SAP features according to embodiments of the invention; execute an application already installed providing OS-SAP features; execute a web based application providing OS-SAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
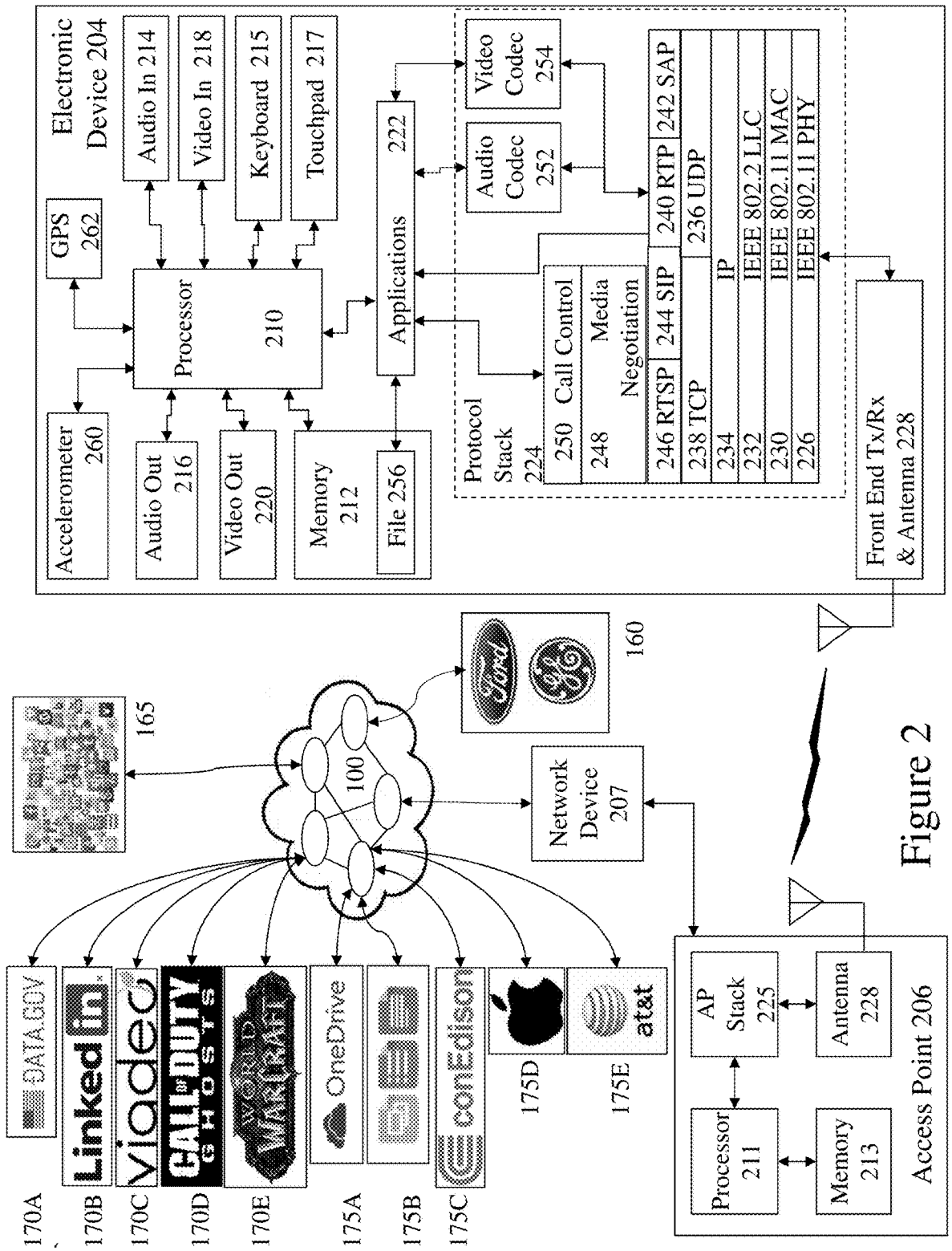
FIG. 2 depicts a wireless portable electronic device supporting communications to a network such as depicted in FIG. 1 and as supporting embodiments of the invention.

Now referring to FIG. 2 there is depicted an electronic device 204 and network access point 207 supporting OS-SAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, Also connected to the network 100 are Social Networks (SOCNETS) 165, cloud document service provider 170A, e.g. US Government open data portal Data.gov, first and second business networks 170B and 170C respectively, e.g. LinkedIn™ and Viadeo™, first to second online gaming communities 170D and 170E respectively, e.g. Call of Duty™ Ghosts and World of Warcraft™ Also connected are first and second cloud storage service providers 175A and 175B, e.g. Microsoft One Drive and Google docs, residential service provider 175C, e.g. ConEdison™, an online multimedia distributor 175D, e.g. Apple™, and telecom service provider 175E, e.g. AT&T.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Those skilled in the art will appreciate that computer systems described above in respect of FIGS. 1 and 2 and below in respect of FIGS. 3 to 10 are merely illustrative and are not intended to limit the scope of the present invention. Such computer systems may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available.

Further, whilst electronic content and software components, for example, are illustrated as being stored in memory while being used, these items or portions of them can be transferred between memory and other storage devices for purposes of memory management and data integrity. Similarly, items illustrated as being present on storage while being used can instead be present in memory and transferred between storage and memory. Alternately, in other embodiments some or all of the software modules may execute in memory on another device. Some or all of the described components or data structures may also be stored (e.g., as instructions or structured data) on a computer-readable medium (e.g., a hard disk, a memory, a network, or a portable article to be read by an appropriate drive), and can be transmitted as generated data signals (e.g., as part of a carrier wave) on a variety of computer-readable transmission mediums (e.g., wireless-based and wired/cable-based mediums). In addition, a "client" or "server" computing device may comprise any combination of hardware or software that can interact, including computers, network devices, internet appliances, PDAs, wireless phones, pagers, electronic organizers, television-based systems and various other consumer products that include inter-communication capabilities. Accordingly, the present invention may be practiced with other computer system configurations.

1. Optimal Method of Computing the Optimal Distribution of A Public Folder Hierarchy into Public Folder Mailboxes As outlined supra one of the challenges in migration from a legacy public folder hierarchy to a new public folder mailbox scheme is handling the sizing and partitioning of the legacy public folder hierarchy into the new public folder mailbox structure. Accordingly, the inventors have established a method of computing the optical distribution of a public folder hierarchy into public folder mailboxes.

Figure 3:
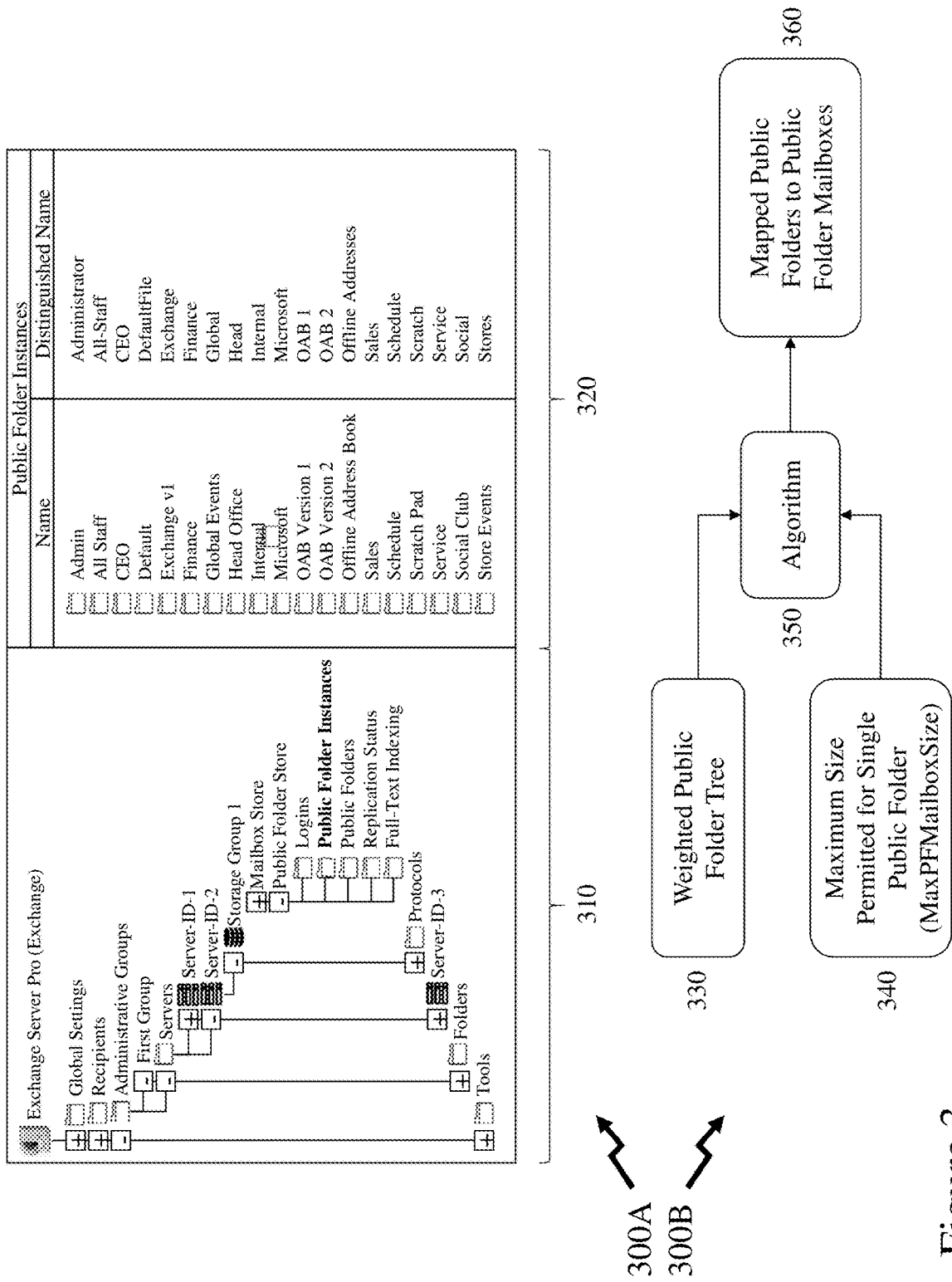
FIG. 3 depicts an exemplary public folder structure of an enterprise together with an overview process flow for mapping folders.

An example of a legacy public folder hierarchy from a software application such as File Explorer for Windows™ is depicted in image 300A in FIG. 3. Accordingly, as depicted left window 310 depicts the network hierarchy presented to the user through such a software application showing the Exchange Server and the groups/servers associated with the Exchange Server such as "Server-ID-1", "Server-ID-2" and "Server-ID-3". Also depicted is the hierarchy for "Server- ID-2" indicating that a storage "Storage Group 1" and folder "Protocols" exist. The hierarchy for "Storage Group 1" is also depicted showing that it comprises "Mailbox Store" and "Public Folder Store" which itself comprises folders "Logins", "Public Folder Instances", "Public Folders", "Replication Status" and "Full-Text Indexing." Right window 320 lists the folders within the "Public Folder Instances" including the names of the folders, e.g. "Admin", "All Staff", "CEO", etc. together with their distinguished names "Administrator", "All-Staff", "CEO" etc.

Referring to process flow 300B there is depicted an exemplary flow for converting a legacy public folder hierarchy into a new public folder mailbox structure. As depicted a weighted public folder tree 330 together with a maximum size permitted for any single public folder (MaxPFMailboxSize) 340 are inputs to an algorithm 350 which outputs the public folders mapped to the new public folder mailboxes. The weighted public folder tree 330 has multiple nodes, where each node is a public folder and has a weight equal to the total size of all items in the subtree rooted at that node.

Figure 4:
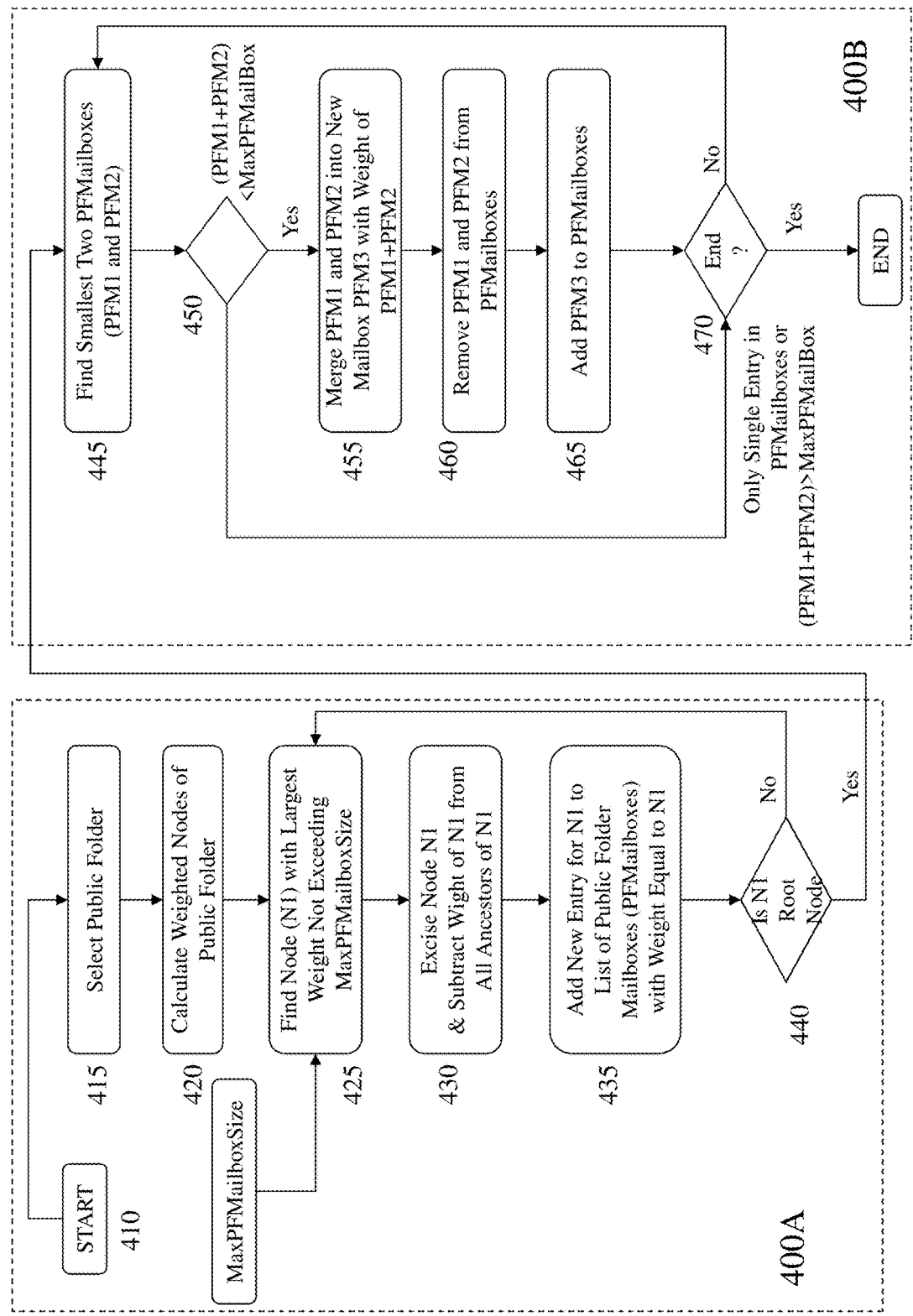
FIG. 4 depicts an exemplary process flow for an algorithm employed in computing an optimal distribution of a public folder hierarchy into public folder mailboxes.
Figure 5:
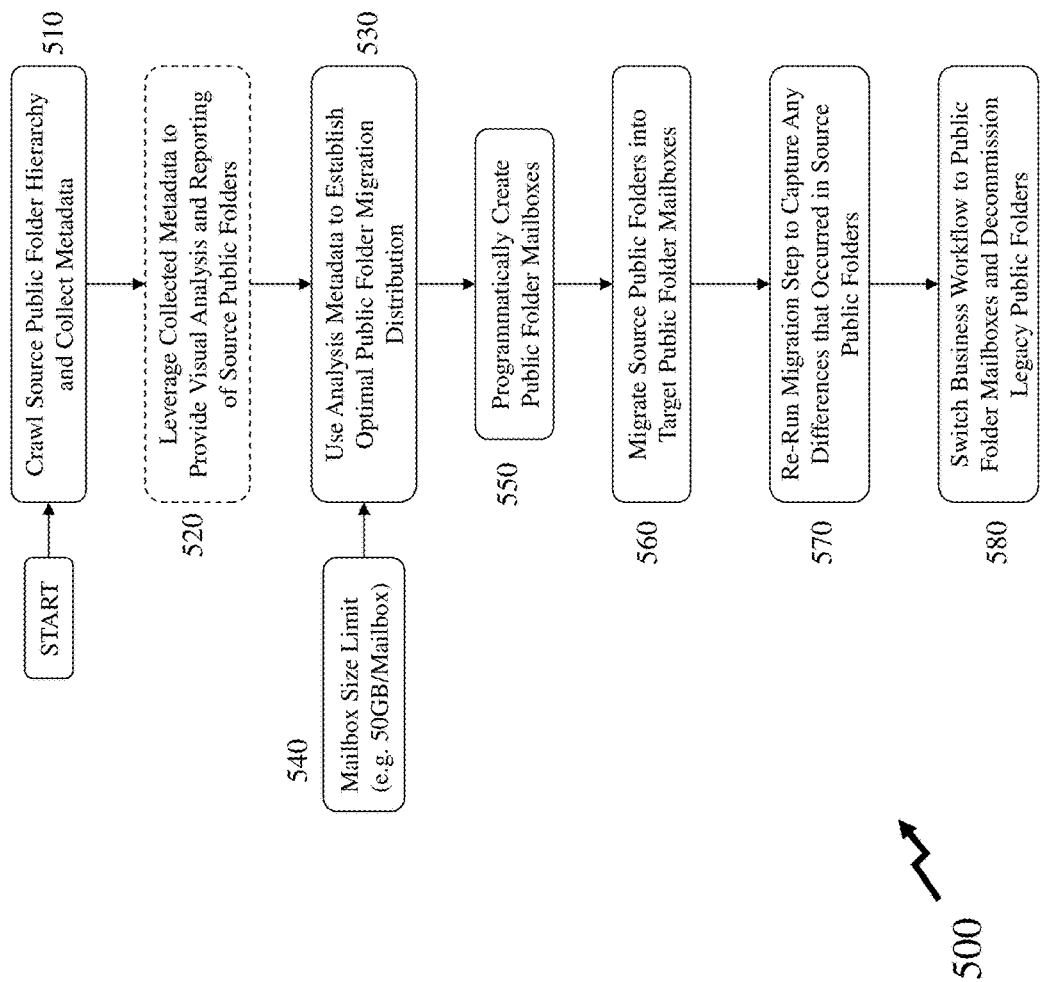
FIG. 5 depicts an exemplary process flow for migrating public folders into cloud public folders without downtime.

A mapping algorithm, such as that depicted in FIG. 4, according to an embodiment of the invention establishes the minimum number of new public folder mailboxes wherein the size of any public folder mailbox does not exceed the maximum permitted size, MaxPFMailboxSize 340. Each created public folder mailbox can have multiple folders associated with it. All content in a subtree rooted at a folder specified in a public folder mailbox (M1) belongs to M1 except those branches whose folder is found rooted in another public folder mailbox.

Referring to FIG. 4 there is depicted a process flow 400 according to an embodiment of the invention comprising steps 410 to 480 comprising a first sub-process 400A followed by second sub-process 400B. Accordingly, first sub-process 400A comprises:

Step 410 wherein the process starts;
Step 415 wherein a public folder is selected, for example by a user through a graphical user interface (GUI) or automatically through a conversion program in execution upon the enterprise server(s);
Step 420 wherein the process calculates the weighted nodes of the public folder;
Step 425 wherein the process retrieves the maximum public folder mailbox size, MaxPFMailboxSize which may be, for example, a default within a conversion program in execution upon the enterprise server(s) or be entered by the user through a GUI and then finds the largest node (N1) that does not exceed MaxPFMailboxSize;
Step 430 wherein the node N1 is excised from the public folder tree and the weight of N1 is subtracted from the weight of all ancestors of N1;
Step 435 wherein a new entry for N1 is added to the list of public folder mailboxes, e.g. PFMailboxes, with a weight equal the weight of N1; and
Step 440 wherein a determination is made as to whether N1 was the root node, wherein if not the process loops back to step 425 otherwise it proceeds to second sub-process 400B and step 445 when N1 is the root node as this implies the entire tree was excised.

Accordingly, second sub-process 400B comprises steps 445 to 480 wherein:

Step 445 wherein the process finds the two smallest PFMailboxes, PFM1 and PFM2;
Step 450 wherein the process evaluates whether the summed weights of PFM1 and PFM2 are less than MaxPFMailboxSize or not wherein if they are the process proceeds to step 455 otherwise it proceeds to step 470;
Step 455 wherein the process merges PFM1 and PFM2 into a new public folder mailbox PFM3 such that the PFM3 contains all folders from both PFM1 and PFM2 and the weight of PFM3 equals the weight of PFM1 plus the weight of PFM2;
Step 460 wherein the process removes PFM1 and PFM2 from PFMailboxes;
Step 465 wherein PFM3 is added to PFMailboxes; and
Step 470 wherein a determination is made as to whether there is only a single entry left in PFMailboxes or whether the summed weights of PFM1 and PFM2 exceed MaxPFMailboxSize where for either case the process proceeds to step 480 and terminates or it loops back to step 445.

Accordingly, upon completion PFMailboxes now holds an optimal distribution of public folders into public folder mailboxes subject to the MaxPFMailboxSize limit. It would be evident that the number of PFMailboxes being merged rather than 2 as depicted in FIG. 4 may be set to an alternate number, e.g. 3, 4, etc. Optionally, the conversion process may execute an initial scan to ascertain analytics of the PFMailboxes in order to establish the number of PFMailboxes to merge in order to establish the minimum number of new public folder mailboxes.

2. Method of Migrating Public Folders to Public Folder Mailboxes without Downtime As noted supra whilst cloud software providers help companies migrate their public folders the migration methodology requires downtime in the source public folders. As noted any message delivery to mail-enabled public folders will be queued during this downtime and furthermore, if the migration API has problems during the migration process, it will fail, and the migration must be reattempted in full. For most businesses, this approach is not feasible because of the downtime. They have critical business workflows that require the availability of the public folders.

Accordingly, the inventors have established a public folder migration methodology that requires no downtime of the source public folders. An exemplary process flow according to an embodiment of the invention is depicted by process flow 500 in FIG. 5 comprising steps 510 to 580 respectively. As depicted these comprise:

Step 510: The source public folder hierarchy is crawled to gather metadata about their hierarchy, object counts, sizing, and other attributes;
Step 520 (Optional): Leverage the gathered data to provide visual analysis and reporting of the source public folders;
Step 530: The analytics data gathered in step 520 is employed to determine the optimal public folder migration distribution subject to the public folder mailbox size limitation, e.g. 50 GB/mailbox, which is established in step 540;
Step 550: Using the output of step 530 which defines the optimal public folder mailbox partitioning, the process programmatically creates the public folder mailboxes through the cloud based applications, e.g. Microsoft™ Office365™ and Microsoft™ Exchange Online™;
Step 560 wherein the source public folders are migrated into the target public folder mailboxes;
Step 570 wherein since during the initial bulk migration processing of the backlog migration workload, it is likely that changes occurred in the source public folders, the migration step is re-run to capture any differences, at which point the process proceeds to step 580; and Step 580 wherein the organization can switch their business workflows to the public folder mailboxes and decommission their legacy public folders.

Accordingly, it would be evident to one of skill in the art that as the method according to an embodiment of the invention is asynchronous and incremental, it does not lock the source public folders during the migration process such that they can not only be used but the process explicitly addresses changes to them during the migration process.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   a) establishing a weighted public folder tree wherein each node in the weighted public folder tree is a public folder of a plurality of public folders to be migrated to public folder mailboxes and the weight of the node is equal to the total size of all items in the subtree rooted at the node;
   b) identifying the node with the largest weight node exceeding a predetermined maximum public folder mailbox size (MaxPFMailboxSize);
   c) excise the node (N1) from the weighted public folder tree and subtract its weight from all ancestors of the node N1;
   d) add a new entry for N1 to a list of public folder mailboxes (PFMailboxes) with a weight equal the weight of N1;
   e) repeat steps (b) to (d) until N1 is the root node;
   f) find the two PFMailboxes entries that are the smallest and determine whether the sum of their weights is less than MaxPFMailboxSize;
   g) upon a positive determination performing the steps:
      (h) merge the two PFMailboxes entries into a new public folder mailbox that contains all folders from the two PFMailboxes entries and has a weight equal to the weight of the two PFMailboxes entries;
      (i) removing the two PFMailboxes from the list of PFMailboxes; and
      (j) add the new public folder mailbox to the list of PFMailboxes;
   k) repeat step (g) until either there is only a single entry in PFMailboxes or the weight of the two smallest entries when summed exceeds the MaxPFMailboxSize.

* * * * *